(12) United States Patent
Chen et al.

(10) Patent No.: US 12,377,518 B2
(45) Date of Patent: Aug. 5, 2025

(54) PROCESSING DEVICE AND PROCESSING METHOD THEREOF

(71) Applicant: ROBUFF INC., Taichung (TW)

(72) Inventors: Pengchih Chen, Taichung (TW); Po-Yun Chan, Taichung (TW)

(73) Assignee: ROBUFF INC., Taichung (TW)

( * ) Notice: Subject to any disclaimer, the term of this patent is extended or adjusted under 35 U.S.C. 154(b) by 734 days.

(21) Appl. No.: 17/567,902

(22) Filed: Jan. 4, 2022

(65) Prior Publication Data
US 2023/0158635 A1 May 25, 2023

(30) Foreign Application Priority Data

Nov. 22, 2021 (TW) ................................. 110143351

(51) Int. Cl.
| | |
|---|---|
| *B24B 47/10* | (2006.01) |
| *B24B 41/00* | (2006.01) |
| *B24B 45/00* | (2006.01) |
| *B24B 49/16* | (2006.01) |
| *B25J 11/00* | (2006.01) |
| *B25J 15/04* | (2006.01) |
| *B25J 17/02* | (2006.01) |

(52) U.S. Cl.
CPC ............ *B24B 47/10* (2013.01); *B24B 41/005* (2013.01); *B24B 45/006* (2013.01); *B24B 49/16* (2013.01); *B25J 11/0065* (2013.01); *B25J 15/0416* (2013.01); *B25J 15/0491* (2013.01); *B25J 17/0208* (2013.01); *Y10T 483/1738* (2015.01); *Y10T 483/174* (2015.01)

(58) Field of Classification Search
CPC ....... Y10T 483/1738; Y10T 409/30448; Y10T 409/309296; Y10T 279/1045; Y10T 279/1091; B25J 15/0416; B25J 15/0491; Y10S 483/901; B23Q 2003/1558; B23Q 5/045; B23Q 5/046
See application file for complete search history.

(56) References Cited

U.S. PATENT DOCUMENTS

2008/0254959 A1* 10/2008 Takayama ............ B23Q 1/5412
483/32

FOREIGN PATENT DOCUMENTS

JP 2003-117869 A * 4/2003

OTHER PUBLICATIONS

JP2003-117869 Translation (Year: 2003).*
Webster's Dictionary Definition of Robot (Year: 1998).*

* cited by examiner

*Primary Examiner* — Sunil K Singh
*Assistant Examiner* — Eric Daniel Whitmire

(57) ABSTRACT

A processing device with a constant force spindle capable of quickly switching a force control axial direction and a processing method thereof, having a quick-detach unit fixed at a constant force control unit by a first quick-connecting piece, and respectively connecting and moving synchronously with the spindle by a second quick-connecting piece and a third quick-connecting piece, the first quick-connecting piece moves along with a working end of a multi-axial transfer unit, and when combined, a first axial direction that is coaxial with the force control axial direction is defined; alternatively, the first quick-connecting piece moves along with the working end of the multi-axial transfer unit, and when combined, a second axial direction that is coaxial with the force control axial direction is defined, the first axial direction is not parallel to the second axial direction and has an included angle.

8 Claims, 11 Drawing Sheets

PROCESSING DEVICE AND PROCESSING METHOD THEREOF

CROSS-REFERENCE TO RELATED APPLICATION

This non-provisional application claims priority under 35 U.S.C. § 119(a) on Patent Application No(s). 110143351 filed in Taiwan, R.O.C. on Nov. 22, 2021, the entire contents of which are hereby incorporated by reference.

BACKGROUND OF THE INVENTION

1. Field of the Invention

The present disclosure provides a processing device, especially a processing device with a constant force spindle capable of quickly switching a force control axial direction and a processing method thereof.

2. Description of the Related Art

The traditional processing devices such as grinders can be mounted with a tool of emery cloth wheel to grind the surface of a workpiece for processing by hand, the direction of processing can be roughly divided into axial grinding and radial grinding, the former such as a grinding method by a sheet emery cloth wheel is common, and the latter such as a grinding method by a wheel-shaped emery cloth wheel is common. The traditional automatic processing device can be connected to a constant force control element through a spindle, and the aforementioned emery cloth wheel can be mounted to grind the surface of the workpiece, at this time the emery cloth wheel can maintain a constant force through the constant force control element when grinding the surface of the workpiece.

However, the aforementioned processing device with a constant force control element has the following problems:

First, when there is a fixed connection between the constant force control element and the spindle, they cannot be quickly disassembled or assembled normally, and thus if it is desired to change the processing direction of the tool, the method can only be that the original spindle is manually disassembled, and then it is manually replaced by a spindle with a different processing direction, and the process of manual replacement of the spindle takes time and manpower, resulting in poor process efficiency and labor costs are difficult to save.

Second, it is assumed that the constant force control element and the spindle can be quickly disassembled or assembled, but the constant force control element can only provide maintaining a constant force in a fixed force control axial direction when the same spindle is processing, for example, the constant force control element is set to maintain the constant force when the spindle mounting with a sheet emery cloth wheel to axially grind the workpiece, when the same spindle is changed to mount a wheel-shaped emery cloth wheel and switched to a radial grinding, the constant force control element cannot continue to provide the function of maintaining the constant force.

Third, it is assumed that the constant force control element is connected to the spindle, and connected with, for example, an angle-adjustable element in series, by which the constant force control element can adjust the force control axial direction by pivoting within an angle range. However, if the force control axial direction needs a large angle adjustment (e.g., 90 degrees), the angle-adjustable element is difficult to put in place at once through the pivoting adjustment, it is not possible to quickly switch the force control axial direction at a large angle, and the additional series connection of the angle-adjustable element may cause the problems of the increase of processing error and a reduction of the sensitivity of the constant force control.

BRIEF SUMMARY OF THE INVENTION

The inventor exhausted his mind to research carefully, and then developed a processing device with a constant force spindle capable of quickly switching a force control axial direction and a processing method thereof, with a view to the automated process can achieve quickly switching the force control axial direction at a large angle.

The present disclosure provides a processing device with a constant force spindle capable of quickly switching a force control axial direction, which comprises a multi-axial transfer unit, a spindle, a constant force control unit and a quick-detach unit. The multi-axial transfer unit comprises a working end, the working end is controlled by the multi-axial transfer unit, and can axially move in three-dimension relative to a workpiece; the spindle is used to disassemble therefrom and assemble with a tool for processing the workpiece; the constant force control unit has a first end and a second end at two opposite ends, the constant force control unit is fixed at the working end via the first end and defines a force control axial direction; and the quick-detach unit comprises a first quick-connecting piece fixed at the second end of the constant force control unit, and comprises a second quick-connecting piece and a third quick-connecting piece, respectively connecting and moving synchronously with the spindle, the first quick-connecting piece moves along with the working end, and can be quick-detachably combined with or disengaged from the second quick-connecting piece, and when combined, a first axial direction that is coaxial with the force control axial direction is defined; alternatively, the first quick-connecting piece moves along with the working end, and can be quick-detachably combined with or disengaged from the third quick-connecting piece, and when combined, a second axial direction that is coaxial with the force control axial direction is defined, the first axial direction is not parallel to the second axial direction and has an included angle, so that the spindle can select the first axial direction or the second axial direction to be coaxial with the force control axial direction to process the workpiece.

The present disclosure further provides a processing method of the processing device with a constant force spindle capable of quickly switching a force control axial direction, which is carried out by automatic control, comprising the following steps: controlling the working end by the multi-axial transfer unit to move the first quick-connecting piece to align and combine the second quick-connecting piece or the third quick-connecting piece, the first axial direction or the second axial direction is selected to be coaxial with the force control axial direction, and the spindle is assembled to the working end; controlling the working end by the multi-axial transfer unit to move to a place for placing the tools in order to take the tool; controlling the working end by the multi-axial transfer unit to move and process the workpiece by the selected first axial direction or the selected second axial direction that is coaxial with the force control axial direction; and controlling the working end by the multi-axial transfer unit to move to the place for placing the tools in order to place the tool.

Therefore, the processing device of the present disclosure may select the first axial direction or the second axial direction to be coaxial with the force control axial direction through the spindle with the needs of the processing direction, that is, it can quickly switch the force control axial direction at a large angle, and can maintain a constant force when switching the direction of processing the workpiece, in order to solve the problem of poor process efficiency and difficult to save manpower costs, and solve the problems of the increase of processing errors and leading to a reduction in the sensitivity of constant force control caused by increasing the series connection of elements, thereby achieving the effects of processing accuracy stability and process efficiency improvement.

DETAILED DESCRIPTION OF THE INVENTION

Figure 1:
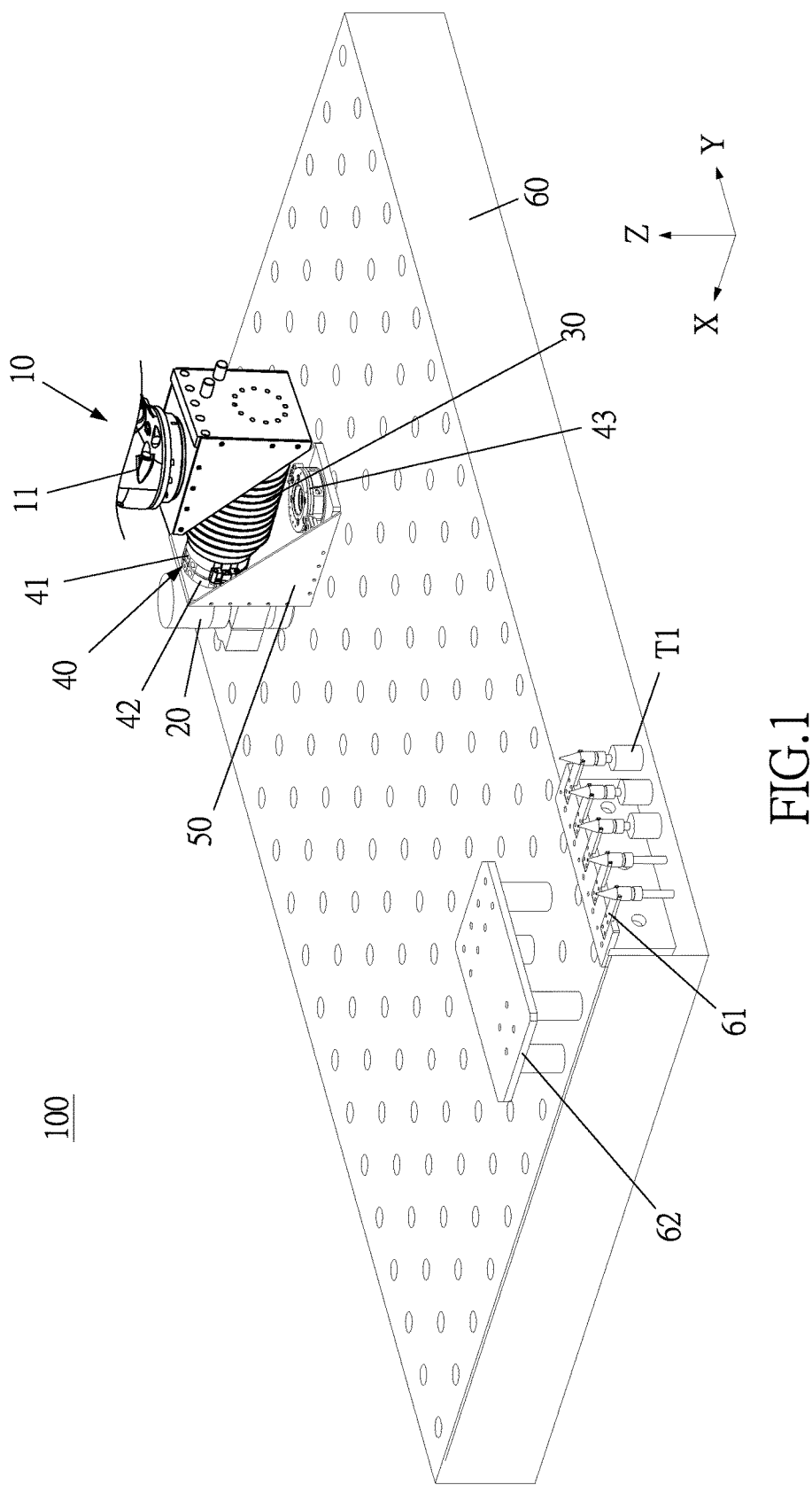
FIG. 1 is a schematic view of the state of use of a processing device connecting a spindle in a first axial direction according to an embodiment of the present disclosure.

To facilitate understanding of the object, characteristics and effects of this present disclosure, embodiments together with the attached drawings for the detailed description of the present disclosure are provided. The description is provided as follows:

Referring to FIGS. 1 to 11, the present disclosure provides a processing device 100 with a constant force spindle capable of quickly switching a force control axial direction, which comprises a multi-axial transfer unit 10, a spindle 20, a constant force control unit 30 and a quick-detach unit 40, and further comprises a fixed seat 50 and a workbench 60 in the following embodiment, wherein:

As shown in FIG. 1, the multi-axial transfer unit 10 comprises a working end 11, the working end 11 is controlled by the multi-axial transfer unit 10, and can axially move in three-dimension relative to a workpiece W. In an embodiment, the multi-axial transfer unit 10 is a robotic arm, but the present disclosure is not limited to a robotic arm, whatever one can provide a three-dimensional (X-Y-Z) axial displacement for the working end 11 relative to the workpiece W, such as a gantry processing machine that is just the protection scope to be desired by the multi-axial transfer unit of the present disclosure. The multi-axial transfer unit 10, which is controlled by an automatic control system comprising a programmable logic controller, sensor and actuator (not shown in the figures), can be programmed for automated processing.

Figure 2:
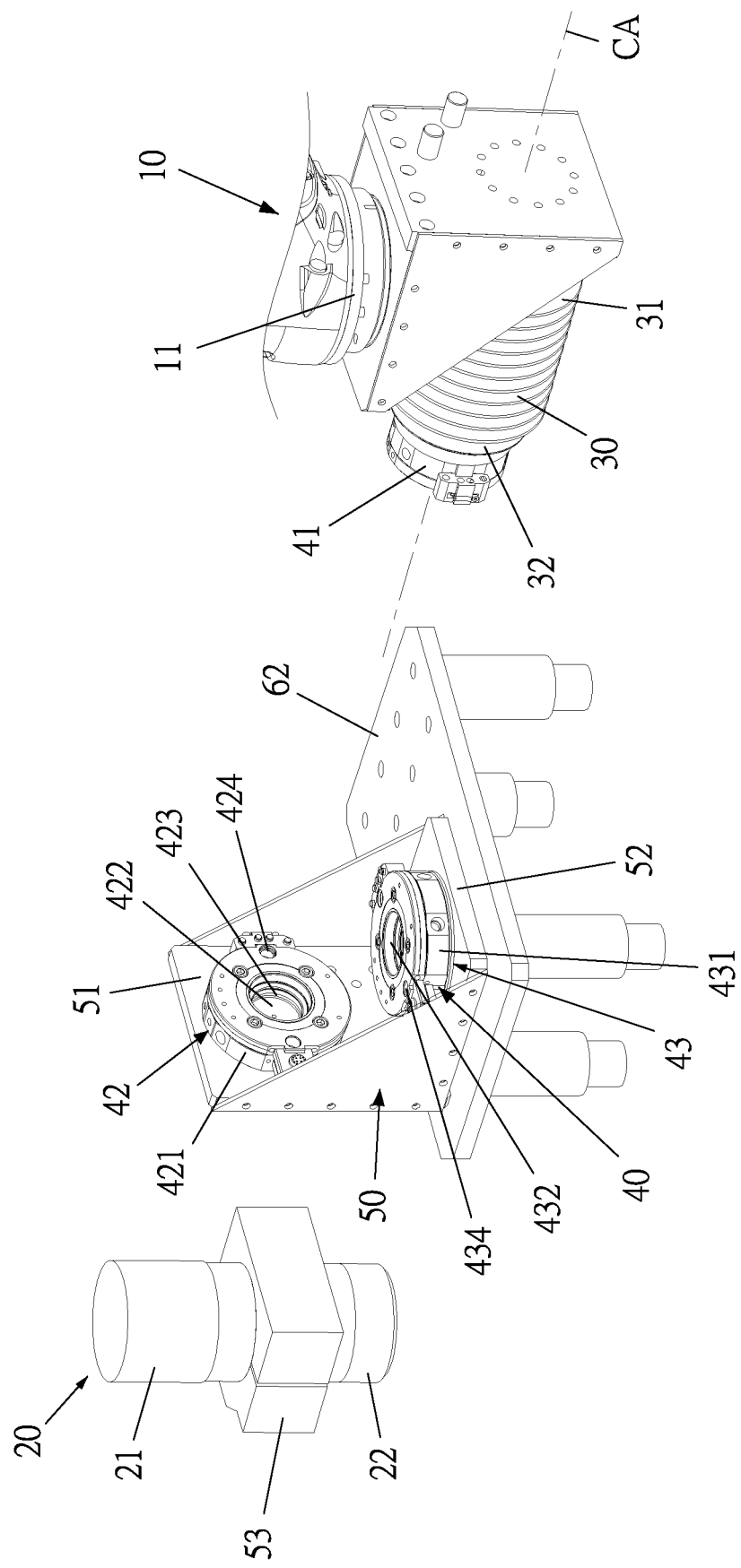
FIG. 2 is an exploded view of the spindle, fixed seat and constant force control unit according to the embodiment of the present disclosure.
Figure 7:
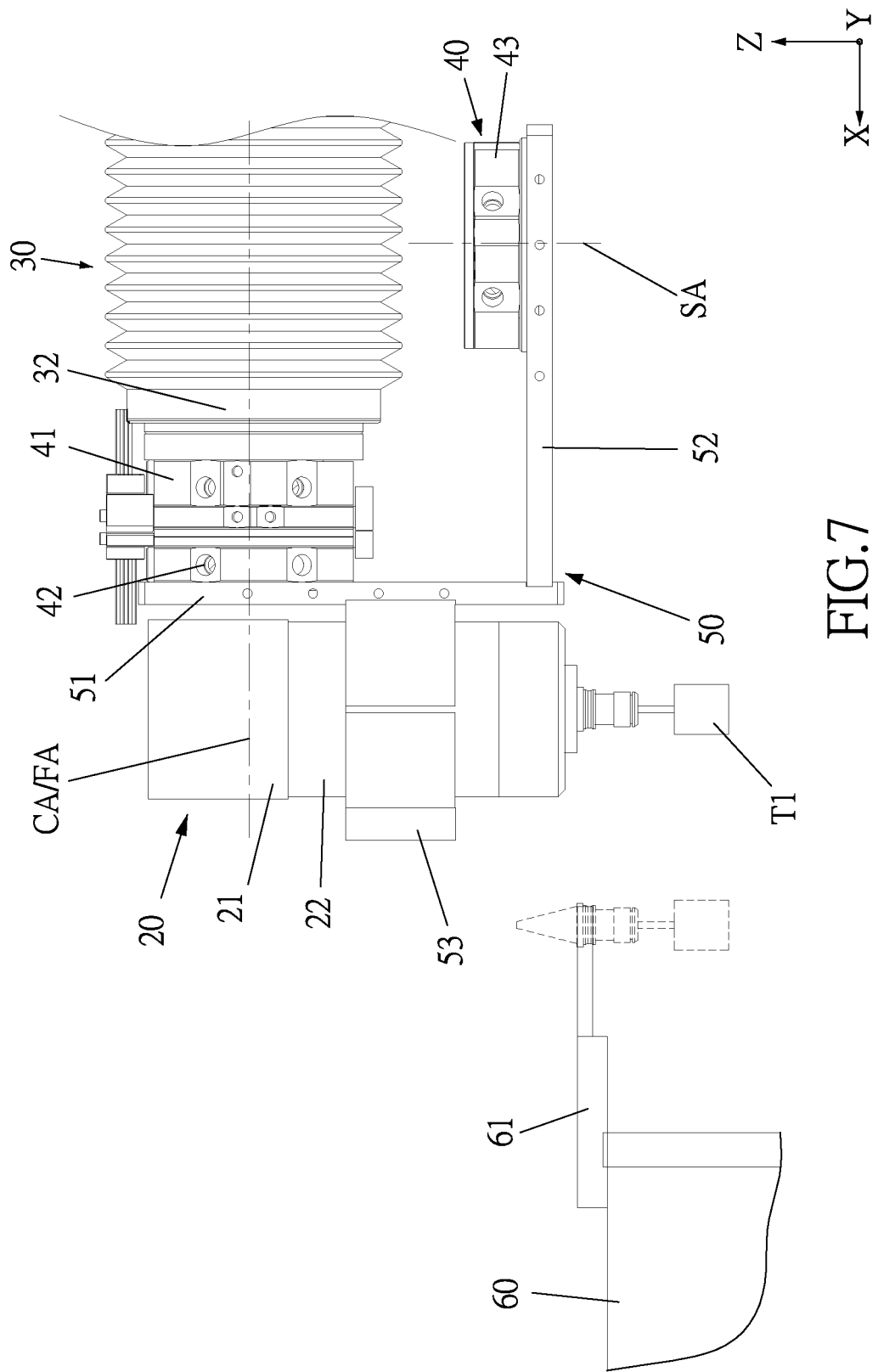
FIG. 7 is a schematic view of the action of the spindle moving along with the working end to take a tool (or return a tool) continuing from FIG. 5.
Figure 10:
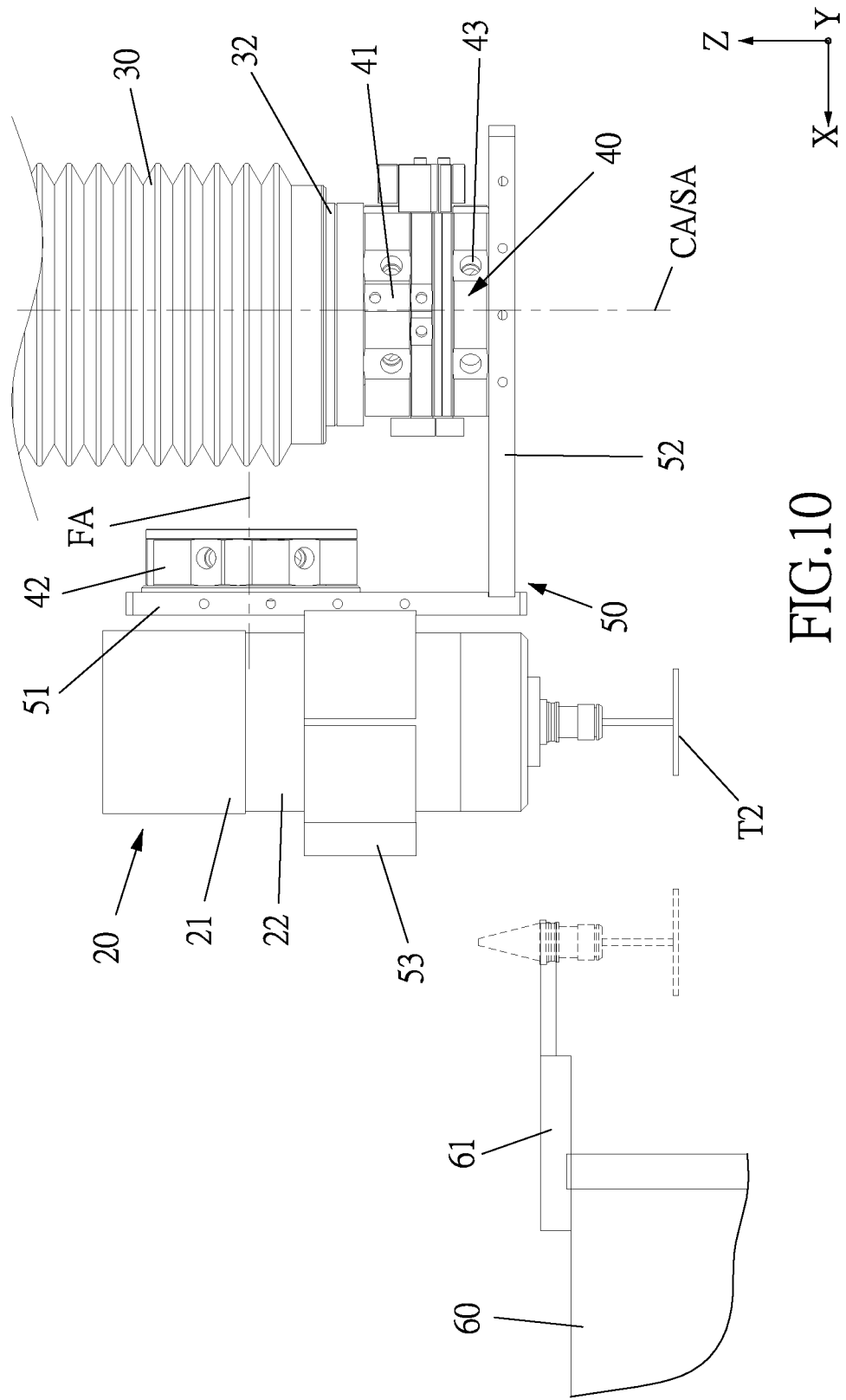
FIG. 10 is a schematic view of the action of the spindle connecting the constant force control unit in the second axial direction and moving along with the working end to take the tool (or return the tool) according to the embodiment of the present disclosure.

As shown in FIGS. 7 and 10, the spindle 20 can be used to disassemble therefrom and assemble with a tool for processing the workpiece W. In an embodiment, as shown in FIG. 2, the spindle 20 comprises a tool clamping and unclamping part 21 and a motor 22, the tool clamping and unclamping part 21 is driven by a fluid pressure to carry out a tool clamping and unclamping action, including tool clamping and tool unclamping at the time of mounting the tool (not shown in the figures), the fluid pressure in this embodiment is a high-pressure gas, and in different embodiments it can also be oil pressure, the motor 22 is driven by electricity, and when the spindle 20 is mounted with the tool via the tool clamping and unclamping part 21, the motor 22 is used to drive the tool rotating and processing the workpiece W. In the embodiment, the tool is an emery cloth wheel, including a wheel-shaped emery cloth wheel T1 and a sheet emery cloth wheel T2, but not limited to herein.

The constant force control unit 30 mainly provides the tool capable of maintaining a constant force to process the workpiece W, the constant force control unit 30 has a first end 31 and a second end 32 at two opposite ends, the constant force control unit 30 is fixed at the working end 11 via the first end 31 and defines a force control axial direction CA (as shown in FIG. 2). The constant force control unit 30 provides the function of maintaining the constant force by, for example, a telescopic mechanism, three-dimensional accelerometer and load cell (not shown in the figures).

Figure 3:
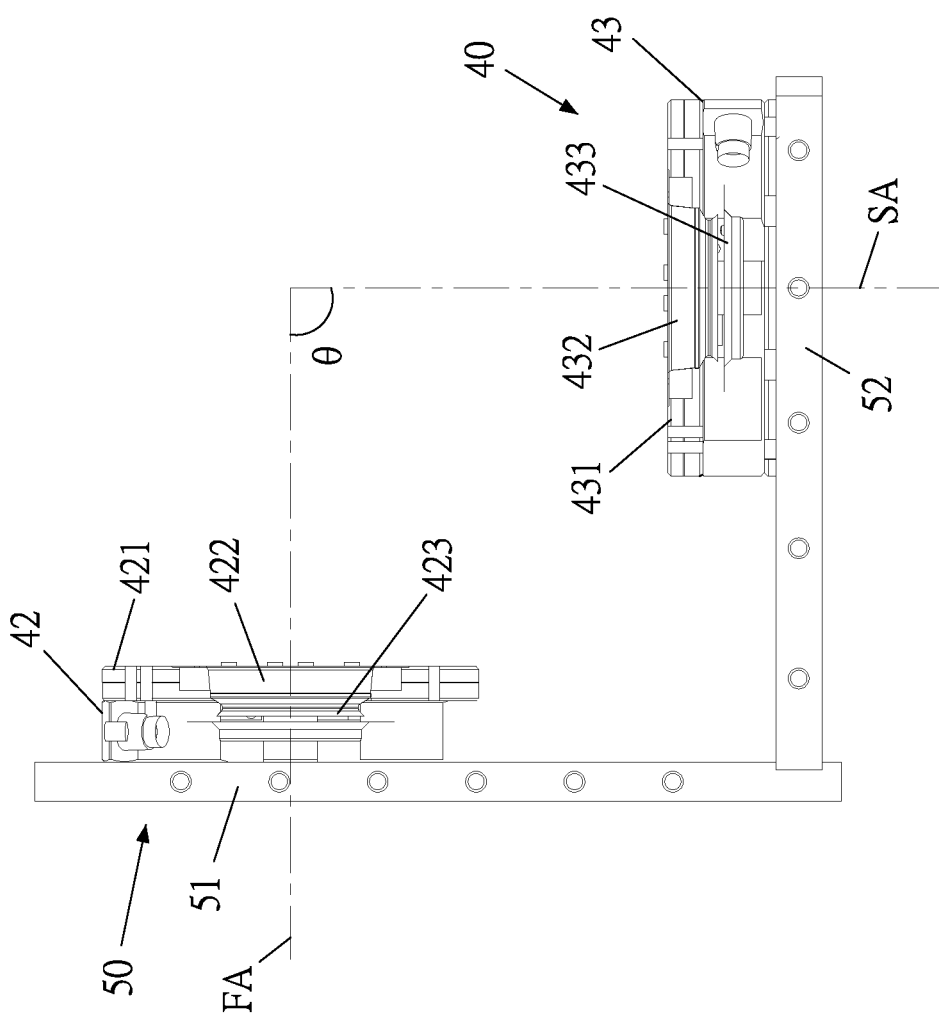
FIG. 3 is a sectional view of the structure of a second quick-connecting piece and a third quick-connecting piece set on the fixed seat according to an embodiment of the present disclosure.

The quick-detach unit 40 comprises a first quick-connecting piece 41 fixed at the second end 32 of the constant force control unit 30, as shown in FIG. 3, the quick-detach unit 40 also comprises a second quick-connecting piece 42 and a third quick-connecting piece 43, respectively connecting and moving synchronously with the spindle 20, the first quick-connecting piece 41 moves along with the working end 11, and can be quick-detachably combined with or disengaged from the second quick-connecting piece 42, and when combined, a first axial direction FA that is coaxial with the force control axial direction CA is defined; alternatively, the first quick-connecting piece 41 moves along with the working end 11, and can be quick-detachably combined with or disengaged from the third quick-connecting piece 43, and when combined, a second axial direction SA that is coaxial with the force control axial direction CA is defined (as shown in FIG. 3), the first axial direction FA is not parallel to the second axial direction SA and has an included angle θ, so that the spindle 20 can select the first axial direction FA or the second axial direction SA to be coaxial with the force control axial direction CA to process the workpiece W. The first axial direction FA and the second axial direction SA are not be limited to the present embodiment, and in different embodiments, the first axial direction FA may be the second axial direction SA, and the second axial direction SA may also be the first axial direction FA.

Figure 4:
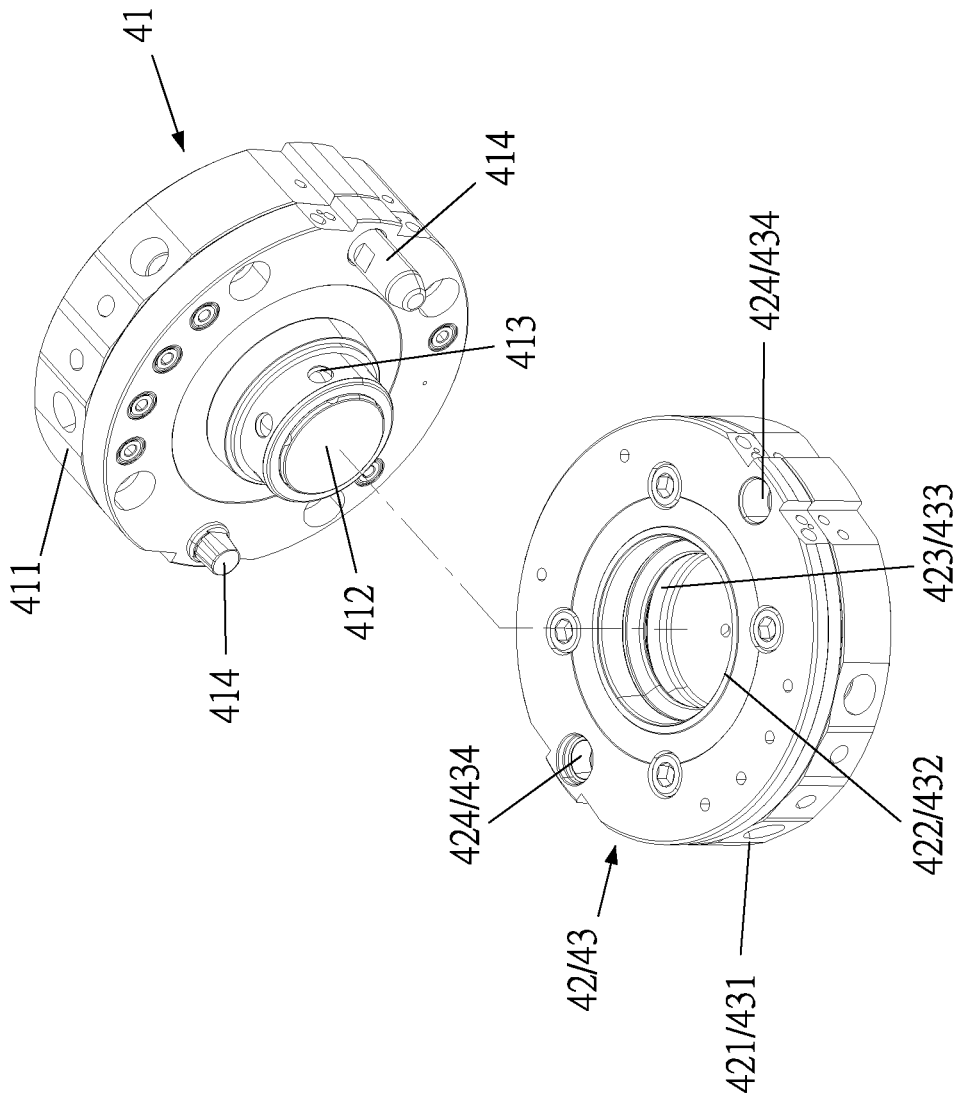
FIG. 4 is a structural view of a first quick-connecting piece and the second quick-connecting piece or the third quick-connecting piece according to an embodiment of the present disclosure.

In an embodiment, as shown in FIG. 4, the quick-connecting piece 41 has a first seat part 411, a convex part 412 and a first quick-detach part, the convex part 412 protrudes from a side of the first seat part 411, the first quick-detach part is set in the first seat part 411 and/or the convex part 412. Preferably, the first quick-detach part of the embodiment is a plurality of spheres 413, the plurality of spheres 413 are set in a circumference of the convex part 412, and the actuation of the plurality of spheres 413 is linking relative to a radial direction of the convex part 412 and protrudes from or retracts into the convex part 412.

In an embodiment, as shown in FIG. 4, the second quick-connecting piece 42 has a second seat part 421, a concave part 422 and a second quick-detach part, wherein the concave part 422 is recessed from a side of the second seat part 421; the third quick-connecting piece 43 has a second seat part 431, a concave part 432 and a second quick-detach part, wherein the concave part 432 is recessed from a side of the third seat part 431, the convex part 412 and the concave parts 422, 432 have the shapes that are protruded and recessed correspondingly, and can be connected, the quick-detachably combining or disengaging is caused by the first quick-detach part actuating relative to the second quick-detach part. Preferably, the second quick-detach parts of the second quick-connecting piece 42 and the third quick-connecting piece 43 are respectively a groove 423 and a groove 433, the groove 423 is set in the concave part 422 of the second seat part 421, the groove 433 is set in the concave part 432 of the second seat part 431. When the convex part 412 and the concave part 422 are connected, the plurality of spheres 413 are protruding to fasten into the groove 423 and combine; also, when the convex part 412 and the concave part 432 are connected, the plurality of spheres 413 are protruding to fasten into the groove 433 and combine. The plurality of spheres 413 are recessed and can be disengaged from the corresponding grooves 423, 433, so that the convex part 412 and each concave part 422, 432 as connected can be detached.

Figure 5:
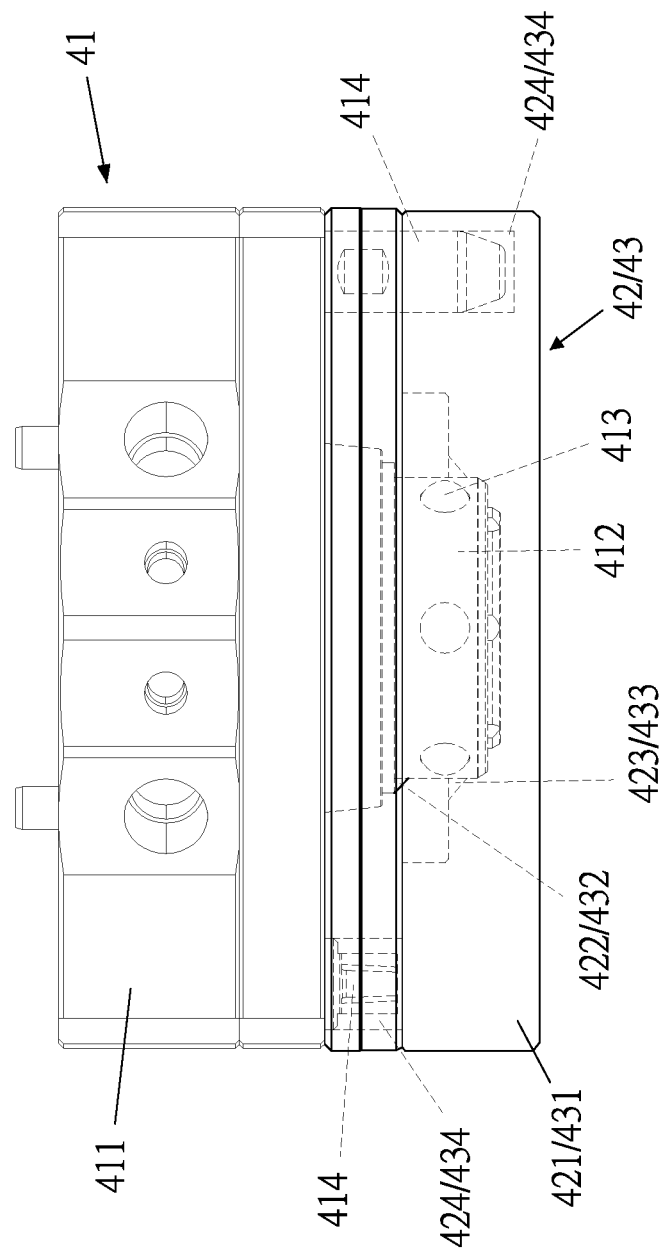
FIG. 5 is a structural view of the first quick-connecting piece connecting to the second quick-connecting piece or the third quick-connecting piece according to an embodiment of the present disclosure.

In an embodiment, as shown in FIGS. 4 and 5, the convex part 412 of the first quick-connecting piece 41 is set in the center of the first seat part 411, and the first seat part 411 in the embodiment has a pair of pins 414 at two opposite sides of the convex part 412; the concave part 422 of the second quick-connecting piece 42 is set in the center of the second seat part 421, and the second seat part 421 has a pair of sockets 424 at two opposite sides of the concave part 422, when the convex part 412 and the concave part 422 are connected, the pin 414 is correspondingly inserted into the socket 424 to assist in positioning; the concave part 432 of the third quick-connecting piece 43 is set in the center of the second seat part 431, and the second seat part 431 also has a pair of sockets 434 at two opposite sides of the concave part 432, the convex part 412 and the concave part 432 are connected, the pin 414 is correspondingly inserted into the socket 434 to assist in positioning.

The fixed seat 50 has a first plate part 51 and a second plate part 52, and is L-shaped, the first plate part 51 and/or the second plate part 52 has a clamping seat 53 on one side, the spindle 20 is clamped and fixed by the clamping seat 53; the second quick-connecting piece 42 and the third quick-connecting piece 43 are respectively set on the first plate part 51 and the second plate part 52 at the inner corner side of the fixed seat 50, and connected to the spindle 20, and the included angle is 90 degrees. Preferably, the clamping seat 53 in the embodiment is set on the second plate part 52 and the setting orientation is opposite to that of the third quick-connecting piece 43, the clamping seat 53 can be fixed by, for example, a fixing element such as a bolt (not shown in the figures) to clamp the spindle 20. The included angle θ of the present disclosure is not limited to 90 degrees of the above embodiment, and under the predictable angle transformation, it shall still fall within the protection scope desired by the present disclosure.

The workbench 60 has a tool frame 61 and a jig 62, wherein the tool frame 61 can be provided for placing a plurality of tools, such as the aforementioned sheet emery cloth wheel and wheel-shaped emery cloth wheel and other different processing types of tools, when the fixed seat 50 is fixed at the working end 11 at the first quick-connecting piece 41 combined with the second quick-connecting piece 42 or the third quick-connecting piece 43, the spindle 20 can change a tool from any of the tools placed on the tool frame 61 along with the displacement of the working end 11; the fixed seat 50 can be separated from the working end 11 along with the first quick-connecting piece 41 disengaged from the second quick-connecting piece 42 or the third quick-connecting piece 43, and is temporarily placed on the jig 62.

The above embodiment provides the processing device 100 with a constant force spindle capable of quickly switching a force control axial direction, and a processing method thereof is carried out by automatic control, comprising the following steps:

Controlling the working end 11 by the multi-axial transfer unit 10 to move the first quick-connecting piece 41 to align and combine the second quick-connecting piece 42, at this time the first axial direction FA is selected to be coaxial with the force control axial direction CA and the spindle 20 is assembled to the working end 11; alternatively, controlling the working end 11 by the multi-axial transfer unit 10 to move the first quick-connecting piece 41 to align and combine the third quick-connecting piece 43, at this time the second axial direction SA is selected to be coaxial with the force control axial direction CA and the spindle 20 is assembled to the working end 11. Next, controlling the working end 11 by the multi-axial transfer unit 10 to move to a tool frame 61 for placing the tools in order to take the tool; after the tool is taken, the multi-axial transfer unit 10 controls the working end 11 to move and process the workpiece W by the selected first axial direction FA or the selected second axial direction SA that is coaxial with the force control axial direction CA. After the completion of the processing, the multi-axial transfer unit 10 controls the working end 11 to move to the tool frame 61 for placing the tools in order to place the tool.

Figure 6:
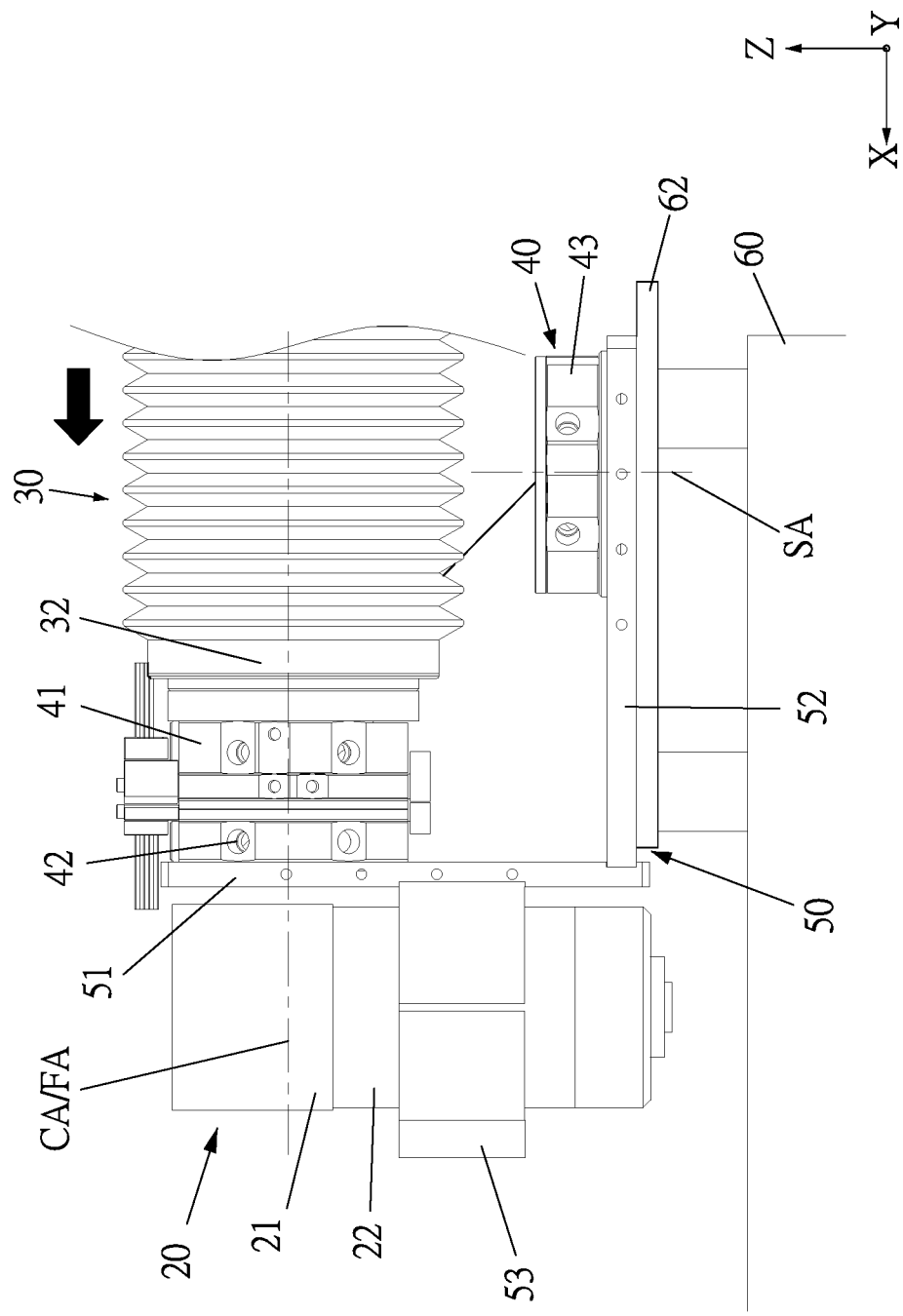
FIG. 6 is a schematic view of the action of the constant force control unit connecting the spindle in the first axial direction according to an embodiment of the present disclosure.
Figure 8:
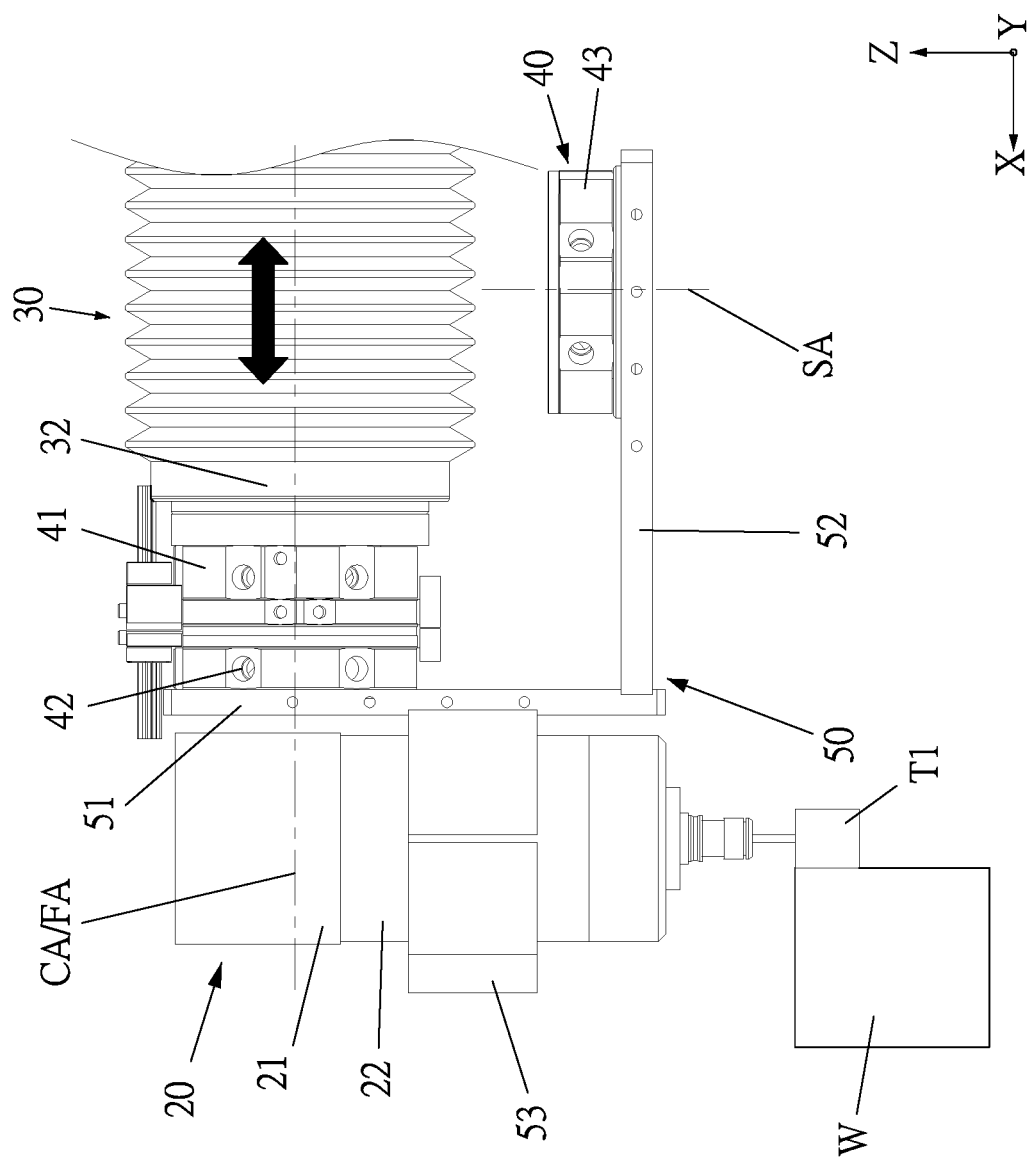
FIG. 8 is a schematic view of the spindle processing a workpiece by the first axial direction after taking the tool continuing from FIG. 7.

To give an example, it is assumed that the process of the tool processing the workpiece W at the time of processing is first grinding the surface of the workpiece W with a wheel-shaped emery cloth wheel T1, and then grinding the surface of the workpiece W with a sheet emery cloth wheel T2, the process can first select the first axial direction FA to be coaxial with the force control axial direction CA, so that the first quick-connecting piece 41 aligns and combines the second quick-connecting piece 42, and the spindle 20 is assembled to the working end 11 (as shown in FIG. 6); next, the working end 11 is controlled by the multi-axial transfer unit 10 to move to a tool frame 61 for placing the wheel-shaped emery cloth wheels T1 to take the tool (as shown in FIG. 7), and then the multi-axial transfer unit 10 controls the working end 11 to move and process the workpiece W with the wheel-shaped emery cloth wheels T1 by the first axial direction FA to be coaxial with the force control axial direction CA (as shown in FIG. 8).

Figure 9:
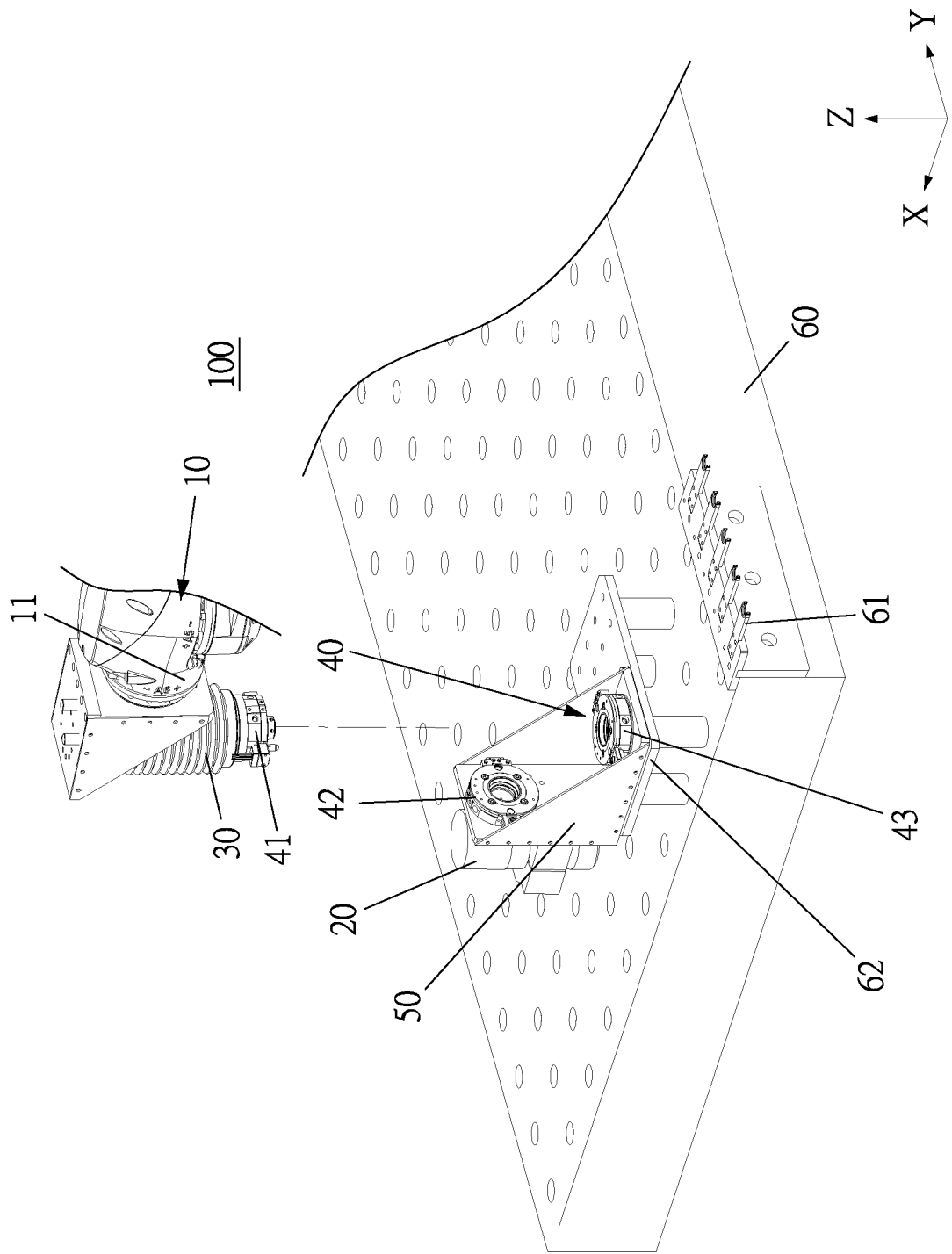
FIG. 9 is a schematic view of the state of use of a processing device connecting the spindle in a second axial direction according to the embodiment of the present disclosure.
Figure 11:
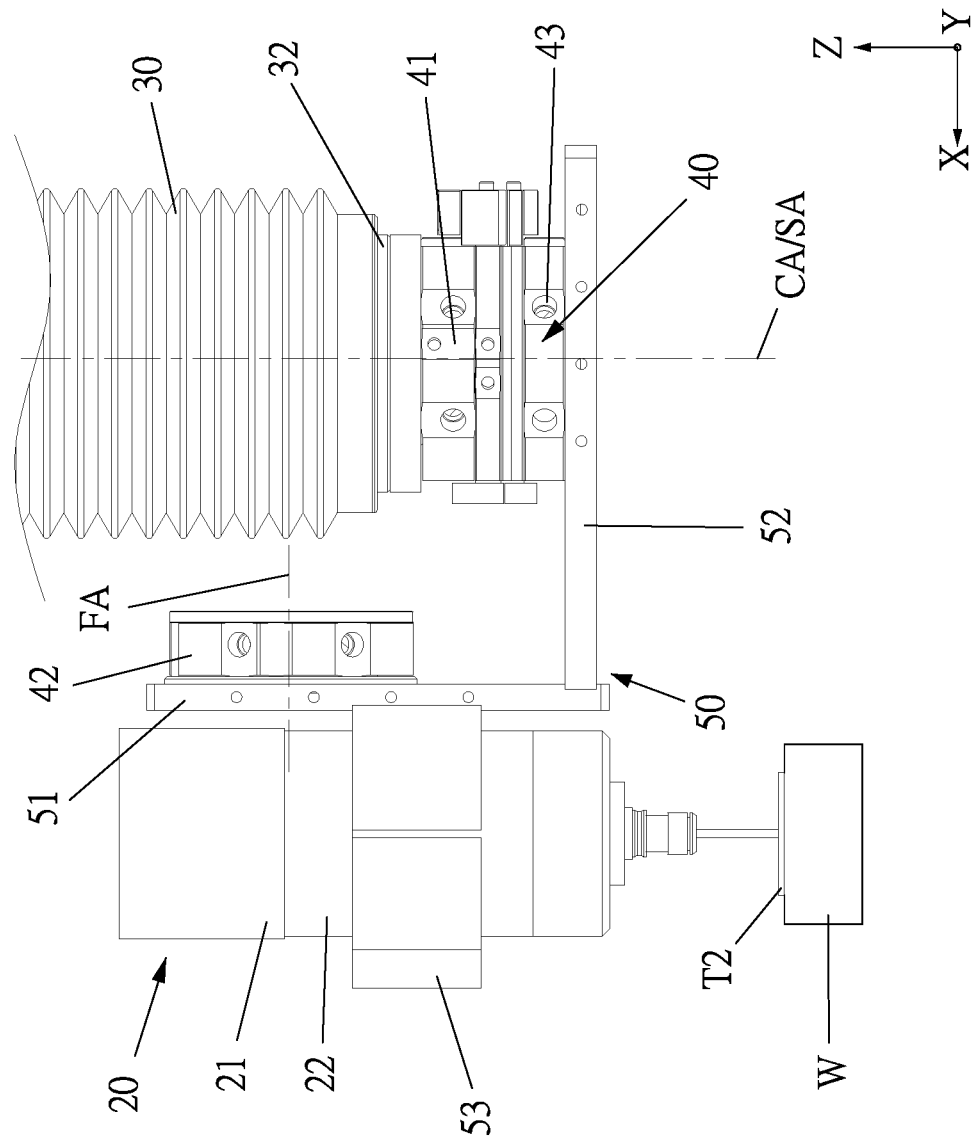
FIG. 11 is a schematic view of the spindle processing the workpiece by the second axial direction after taking the tool continuing from FIG. 10.

Continuously, after the processing of the wheel-shaped emery cloth wheel T1 is completed, the multi-axial transfer unit 10 controls the working end 11 to move to the tool frame 61 for placing the tool in order to place the tool, and then makes the first quick-connecting piece 41 align and combine the third quick-connecting piece 43, and the spindle 20 is assembled to the working end 11 (as shown in FIG. 9), and the working end 11 is controlled by the multi-axial transfer unit 10 to move to the tool frame 61 for placing the sheet emery cloth wheels T2 to take the tool (as shown in FIG. 10), and then the multi-axial transfer unit 10 controls the working end 11 to move and process the workpiece W with the sheet emery cloth wheels T2 by the second axial direction SA to be coaxial with the force control axial direction CA (as shown in FIG. 11) to complete the above process. The executing sequence of steps of the processing method of the present disclosure is not limited to the above embodiment or the claims, and the predictable change of the steps listed shall fall within the protection scope of the processing method of the present disclosure.

By the above description, it is not difficult to find that the characteristic of the present disclosure is that the processing device 100 of the present disclosure may select the first axial direction FA to be coaxial with the force control axial direction CA, or select the second axial direction SA to be coaxial with the force control axial direction CA through the spindle 20 with the needs of the processing direction, that is, it can quickly switch the force control axial direction CA at a large angle, and can maintain a constant force when switching the direction of processing the workpiece W. Compared to the traditional constant force control element and the spindle therebetween having a fixed connection, the processing device of the present disclosure can solve the problem of poor process efficiency and difficult to save manpower costs; in addition, compared to the traditional constant force control element connecting the spindle and connecting a pivotable angle adjusting element in series, the processing device of the present disclosure can solve the problems of the increase of processing errors and leading to a reduction in the sensitivity of constant force control caused by increasing the series connection of elements, therefore, the present disclosure can achieve the effects of processing accuracy stability and process efficiency improvement.

While the present disclosure has been described by means of specific embodiments, those skilled in the art should understand the above description is merely embodiments of the disclosure, and it should not be considered to limit the scope of the disclosure. It should be noted that all changes and substitutions which come within the meaning and range of equivalency of the embodiments are intended to be embraced in the scope of the disclosure. Therefore, the scope of the disclosure is defined by the claims.

What is claimed is:

1. A processing device, comprising:
    a multi-axial transfer unit, comprising a working end, the working end is controlled by the multi-axial transfer unit, and can axially move in three-dimension relative to a workpiece;
    a spindle, used to disassemble therefrom and assemble with a tool for processing the workpiece;
    a constant force control unit, having a first end and a second end at two opposite ends, the constant force control unit is fixed at the working end via the first end and defines a force control axial direction;
    a quick-detach unit, comprising a first quick-connecting piece fixed at the second end of the constant force control unit, and comprising a second quick-connecting piece and a third quick-connecting piece, respectively connecting and moving synchronously with the spindle, the first quick-connecting piece moves along with the working end, and can be quick-detachably combined with or disengaged from the second quick-connecting piece, and when combined, a first axial direction that is coaxial with the force control axial direction is defined; alternatively, the first quick-connecting piece moves along with the working end, and can be quick-detachably combined with or disengaged from the third quick-connecting piece, and when combined, a second axial direction that is coaxial with the force control axial direction is defined, the first axial direction is not parallel to the second axial direction and has an included angle, so that the spindle can select the first axial direction or the second axial direction to be coaxial with the force control axial direction to process the workpiece; and
    a fixed seat, which has a first plate part and a second plate part, and is L-shaped, the first plate part and/or the second plate part has a clamping seat on one side, the spindle is clamped and fixed by the clamping seat; the second quick-connecting piece and the third quick-connecting piece are respectively set on the first plate part and the second plate part at the inner corner side of the fixed seat, and connected to the spindle, and the included angle is 90 degrees,
    wherein the multi-axial transfer unit is a robotic arm, and
    wherein the spindle comprises a tool clamper and unclamper driven by fluid pressure and a motor driven by electricity, the spindle is mounted with the tool via the tool clamping and unclamping part, and the motor is used to drive the tool rotating and processing the workpiece.

2. The processing device according to claim 1, wherein the first quick-connecting piece has a first seat part, a convex part and a first quick-detach part, the convex part protrudes from a side of the first seat part, the first quick-detach part is set in the convex part; the second quick-connecting piece and the third quick-connecting piece respectively have a second seat part, a concave part and a second quick-detach part, each the concave part is recessed from a side of each the second seat part, the convex part and each the concave part have the shapes that are protruded and recessed correspondingly, and can be connected, the quick-detachably combining or disengaging is caused by the first quick-detach part actuating relative to the second quick-detach part.

3. The processing device according to claim 2, wherein the first quick-detach part is a plurality of spheres, the plurality of spheres are set in a circumference of the convex part, and the actuation of the plurality of spheres is linking relative to a radial direction of the convex part and protrudes from or retracts into the convex part; each the second quick-detach part is a groove, each the groove is set in the concave part of each the second seat part, when the convex part and each the concave part are connected, the plurality of spheres are protruding to fasten into the corresponding groove and combine; the plurality of spheres are recessed and can be disengaged from the corresponding groove, so that the convex part and each concave part as connected can be detached.

4. The processing device according to claim 3, wherein the convex part of the first quick-connecting piece is set in the center of the first seat part, and the first seat part has a pin at at least one side of the convex part; each the concave part of the second quick-connecting piece and the third quick-connecting piece is set in the center of the second seat part, and each the second seat part has a socket at at least one side of each the concave part, when the convex part and each the concave part are connected, the pin is correspondingly inserted into each the socket to assist in positioning.

5. The processing device according to claim 1, further comprising a workbench, having a tool frame and a jig, wherein the tool frame can be provided for placing a plurality of the different processing types of tools, when the fixed seat is fixed at the working end at the first quick-connecting piece combined with the second quick-connecting piece or the third quick-connecting piece, the spindle can change a tool from any of the tools placed on the tool frame along with the displacement of the working end; the fixed seat can be separated from the working end along with the first quick-connecting piece disengaged from the second quick-connecting piece or the third quick-connecting piece, and is temporarily placed on the jig.

6. A processing method of the processing device according to claim 1, which is carried out by automatic control, comprising the following steps:
controlling the working end by the multi-axial transfer unit to move the first quick-connecting piece to align and combine the second quick-connecting piece or the third quick-connecting piece, the first axial direction or the second axial direction is selected to be coaxial with the force control axial direction, and the spindle is assembled to the working end;
controlling the working end by the multi-axial transfer unit to move to a place for placing the tools in order to take the tool;
controlling the working end by the multi-axial transfer unit to move and process the workpiece by the selected first axial direction or the selected second axial direction that is coaxial with the force control axial direction; and
controlling the working end by the multi-axial transfer unit to move to the place for placing the tools in order to place the tool.

7. A processing device, comprising:
a robotic arm, comprising a working end, the working end is controlled by the robotic arm, and can axially move in three-dimension relative to a workpiece;
a spindle, comprising a tool clamper and unclamper driven by a fluid pressure and a motor driven by electricity, the spindle is mounted with the tool via the tool clamper and unclamper, and the motor is used to drive the tool rotating and processing the workpiece;
a constant force control unit, having a first end and a second end at two opposite ends, the constant force control unit is fixed at the working end via the first end and defines a force control axial direction;
a fixed seat, having a first plate part and a second plate part, and is L-shaped, the first plate part and/or the second plate part has a clamping seat on one side, the spindle is clamped and fixed by the clamping seat;
a first quick-connecting piece fixed at the second end of the constant force control unit, the first quick-connecting piece has a first seat part, a convex part and a plurality of spheres, the convex part protrudes from a side of the first seat part, and the convex part is set in the center of the first seat part, and the first seat part has a pin at at least one side of the convex part, the plurality of spheres are set in a circumference of the convex part, and the plurality of spheres are linking relative to a radial direction of the convex part and protrudes from or retracts into the convex part;
a second quick-connecting piece and a third quick-connecting piece, respectively set on the first plate part and the second plate part, and connected to the spindle, the second quick-connecting piece and the third quick-connecting piece respectively have a second seat part, a concave part and a groove, each the concave part is recessed from a side of each the second seat part, and each the concave part is set in the center of the second seat part, each the second seat part has a socket at at least one side of each the concave part, each the groove is set in the concave part of each the second seat part, the convex part and each the concave part have the shapes that are protruded and recessed correspondingly, and can be connected, when connected, the plurality of spheres are protruding to fasten into the corresponding groove and combine, and the pin is correspondingly inserted into each the socket to assist in positioning, and the plurality of spheres are recessed and can be disengaged from the corresponding groove, and the pin is disengaged from each the socket, so that the convex part and each concave part as connected can be detached; and
a workbench, having a tool frame and a jig, wherein the tool frame can be provided for placing a plurality of the different processing types of tools, when the fixed seat is fixed at the working end at the first quick-connecting piece combined with the second quick-connecting piece or the third quick-connecting piece, the spindle can change a tool from any of the tools placed on the tool frame along with the displacement of the working end; the fixed seat can be separated from the working end along with the first quick-connecting piece disengaged from the second quick-connecting piece or the third quick-connecting piece, and is temporarily placed on the jig;
the first quick-connecting piece moves along with the working end, and can be quick-detachably combined with or disengaged from the second quick-connecting piece, and when combined, a first axial direction that is coaxial with the force control axial direction is defined; the first quick-connecting piece moves along with the working end, and can be quick-detachably combined with or disengaged from the third quick-connecting piece, and when combined, a second axial direction that is coaxial with the force control axial direction is defined, the first axial direction is not parallel to the second axial direction and has an included angle of 90 degrees, so that the spindle can select the first axial direction or the second axial direction to be coaxial with the force control axial direction to process the workpiece.

8. A processing method of the processing device according to claim 7, which is carried out by automatic control, comprising the following steps:
controlling the working end by the multi-axial transfer unit to move the first quick-connecting piece to align and combine the second quick-connecting piece or the third quick-connecting piece, the first axial direction or the second axial direction is selected to be coaxial with the force control axial direction, and the spindle is assembled to the working end;

controlling the working end by the multi-axial transfer unit to move to a place for placing the tools in order to take the tool;

controlling the working end by the multi-axial transfer unit to move and process the workpiece by the selected first axial direction or the selected second axial direction that is coaxial with the force control axial direction; and controlling the working end by the multi-axial transfer unit to move to the place for placing the tools in order to place the tool.

\* \* \* \* \*